April 22, 1924.

W. ELSNER 1,490,968

BELT FASTENER

Filed Aug. 17, 1922

Patented Apr. 22, 1924.

1,490,968

UNITED STATES PATENT OFFICE.

WILLIAM ELSNER, OF LAUSANNE, SWITZERLAND.

BELT FASTENER.

Application filed August 17, 1922. Serial No. 582,444.

*To all whom it may concern:*

Be it known that I, WILLIAM ELSNER, a citizen of the Swiss Confederation, residing at Lausanne, Switzerland, have invented certain new and useful Improvements in Belt Fasteners, of which the following is a full, clear, and exact description.

The present invention relates to a new and improved belt fastener.

The main object of the invention is to provide a belt fastener which will grip or hold the ends of a belt to be connected without making holes or slots etc. therein or damaging and weakening the belt otherwise.

Another object of the invention is the provision of a belt fastener which allows a ready connection and disconnection of the ends of the belt.

With these and other objects in view the invention consists in the device set forth in the accompanying claim.

Reference should be had to the accompanying drawings, in which

Figure 1:
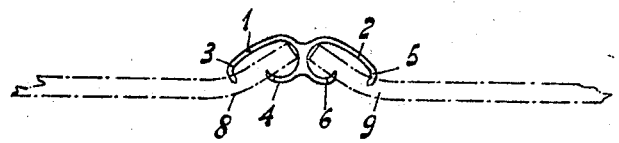
Fig. 1 is a side view of the belt fastener, the ends of the belt being shown in dotted lines.
Figure 2:
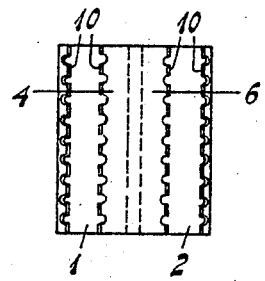
Fig. 2 is a plan view of the belt fastener seen from below.

The belt fastener comprises two claws 1, 2 rigidly connected with each other and forming one piece. Each claw 1 and 2 comprises two flat members 3, 4 and 5, 6 respectively. The members 4, 6 are shorter than the members 3, 5; the outer edges of the members 3, 4, 5, 6 are provided with notches arranged at equal distances apart and having a depth sufficient to produce teeth which may grip the ends 8, 9 of the belt without passing through them or damaging it. The said members are reversely curved, arranged with their concave sides opposed to each other and one of said members is of greater width than the other as shown. The members 3, 4, 5, 6 are at a distance apart equal to the thickness of the belt 8, 9, and the breadth of the members 4, 3 corresponds with the breadth of the belt. The claws 1, 2 are set at an angle with reference to each other, and the ends 8, 9 of the belt are bent off as shown in Fig. 1 in dotted lines to be introduced between the members 3, 4, 5, 6. If the belt running over pulleys is under stress the teeth of the claws 1, 2 are pressed on to the belt and prevent the slipping-off of the ends 9, from the claws 1, 2. The claws 1, 2 may be easily disconnected from the belts 8, 9 as soon as the same is taken off the pulleys.

The belt fastener may be used for leather belts, cotton and rubber belts etc.

What I wish to secure by U. S. patent is:

A belt fastener comprising two claws rigidly fixed to each other and standing at an angle to each other, each claw comprising two members of different length reversely curved, arranged with their concave sides opposed to each other and one of said members overhanging the other said members being provided with teeth.

In witness whereof I affix my signature.

WILLIAM ELSNER.